United States Patent [19]
Cahill

[11] 4,186,335
[45] Jan. 29, 1980

[54] HEARING AID BATTERY RECHARGING APPARATUS

[75] Inventor: Harold J. Cahill, Wilmington, Del.

[73] Assignee: Cahill Enterprises, Inc., Wilmington, Del.

[21] Appl. No.: 835,344

[22] Filed: Sep. 21, 1977

[51] Int. Cl.² .................................................. H02J 7/04
[52] U.S. Cl. ............................................. 320/3; 320/39
[58] Field of Search ........................................ 320/2–5, 320/DIG. 1, 39, 40, 48

[56] References Cited

U.S. PATENT DOCUMENTS

| | | |
|---|---|---|
| 3,297,933 | 1/1967 | McCarthy . |
| 3,414,793 | 12/1968 | Jasperson . |
| 3,517,295 | 6/1970 | La Puyade . |
| 3,603,862 | 9/1971 | Chase et al. ........................... 320/39 |
| 3,912,998 | 10/1975 | Harris . |
| 3,919,616 | 11/1975 | Allison . |
| 3,919,618 | 11/1975 | Coleman et al. .............. 320/DIG. 1 |

FOREIGN PATENT DOCUMENTS

2509392  9/1975  Fed. Rep. of Germany .............. 320/2

*Primary Examiner*—Robert J. Hickey
*Attorney, Agent, or Firm*—Harry J. McCauley

[57] ABSTRACT

An electrical recharging apparatus for hearing aid batteries utilizing C or D dry cells as the charging source, and a solid state regulating circuit connected in shunt with the battery to be charged which maintains the charging current at a safe recharge rate below the level where the battery to be charged will be damaged and the recharge voltage within relatively narrow limits regardless of load, line or service temperature variations.

5 Claims, 4 Drawing Figures

HEARING AID BATTERY RECHARGING APPARATUS

BACKGROUND OF THE INVENTION

Recharging of discharged hearing aid batteries is a relatively difficult task because of their small size, precise and narrow recharge current and voltage limits, and the fact that single recharge economies achieved are small in magnitude, so that expensive recharging equipment is simply not justified. In fact, most hearing aid battery manufacturers label their products as "non-rechargeable".

Several hearing aid battery chargers have been devised which utilize 110 v. a-c domestic power supply circuits, such as shown in U.S. Pat. No. 3,297,933, but these are expensive in first cost and require underwriters' approval, so that they are not very practical.

Thus, there is a real need for a low cost recharging apparatus which will function satisfactorily from a low voltage dry cell source and which will recharge hearing aid batteries repetitively a large number of times without damaging them, and also will be small in size and so stable in operating characteristics that they can be adjusted permanently in the factory before sale, after which no adjustments whatever will be required on the part of the purchasers.

SUMMARY OF THE INVENTION

Generally, the present invention is an electrical recharging apparatus for hearing aid batteries comprising, in electrical circuit in the order recited:

(a) a dry cell charging source supplying, across its output terminals, a charging potential of, nominally, 3 volts, (b) an "ON-OFF" double pole, single throw switch having switching contacts interposed in series with each of the source output terminals, (c) hearing aid battery charging contacts connected at corresponding polarity sides with the output terminals of the source and with the hearing aid battery to be charged via a preselected charging current-controlling resistor and said "ON-OFF" switch, and (d) a voltage regulating circuit connected in shunt with said battery charging contacts past said "ON-OFF" switch comprising a first transistor connected via its collector and emitter elements, respectively, in series relationship between said charging source and one charging contact for said hearing aid battery in a polarity sense maintaining charging current flow through the collector-emitter pair of said first transistor, a second transistor connected with its collector element in circuit with the base element of said first transistor and with the collector element of said first transistor via a preselected biasing resistor which, in conjunction with said second transistor, limits the base-emitter current of said first transistor, emitter element connected to the appropriate polarity side of said charging source and base element connected to the tap of a potentiometer connected from emitter element to emitter element of said transistors in shunt across said battery charging contacts.

An object of the present invention is to provide a compact dry cell-powered apparatus for recharging hearing aid batteries.

Another object of the invention is to provide a safe, low-cost recharging apparatus for hearing aid batteries.

Other objects of the invention include the provision of a portable recharging apparatus for hearing aid batteries which has a long service life, is highly reliable in operation, requires no adjustments by the user, and maintains very precise control of charging currents and voltages, thereby avoiding damage to hearing aid batteries during recharging operation.

DRAWINGS

FIG. 1 is a partially schematic perspective view of a preferred embodiment of the hearing aid battery recharging apparatus of this invention, FIG. 2 is a schematic electrical circuit diagram of the apparatus of FIG. 1, employing NPN transistors in the regulating circuit, FIG. 3 is a schematic electrical circuit diagram of a second embodiment of hearing aid battery recharging apparatus according to this invention, and FIG. 4 is a fragmentary schematic electrical circuit diagram of apparatus of the embodiment of FIG. 2 employing PNP transistors in the regulating circuit.

DESCRIPTION OF THE PREFERRED EMBODIMENT

Although manufacturers of hearing aid batteries frequently label their products as "non-rechargeable", I have found that recharging is indeed practicable if the following precautions are observed:

1. The hearing aid battery is not discharged too deeply before being recharged,
2. A high recharge current rate is avoided, so as not to explode or otherwise damage the batteries to be recharged, and
3. The recharge voltage rate is maintained within relatively narrow limits.

The two principal standard hearing aid battery designs now being marketed are the silver oxide (Type 76) and the mercurous oxide (Type 675), both of which are rechargeable by the apparatus of this invention, provided that the apparatus voltage regulating potentiometer is set appropriately for the specific hearing aid battery design to be serviced.

Figure 2:
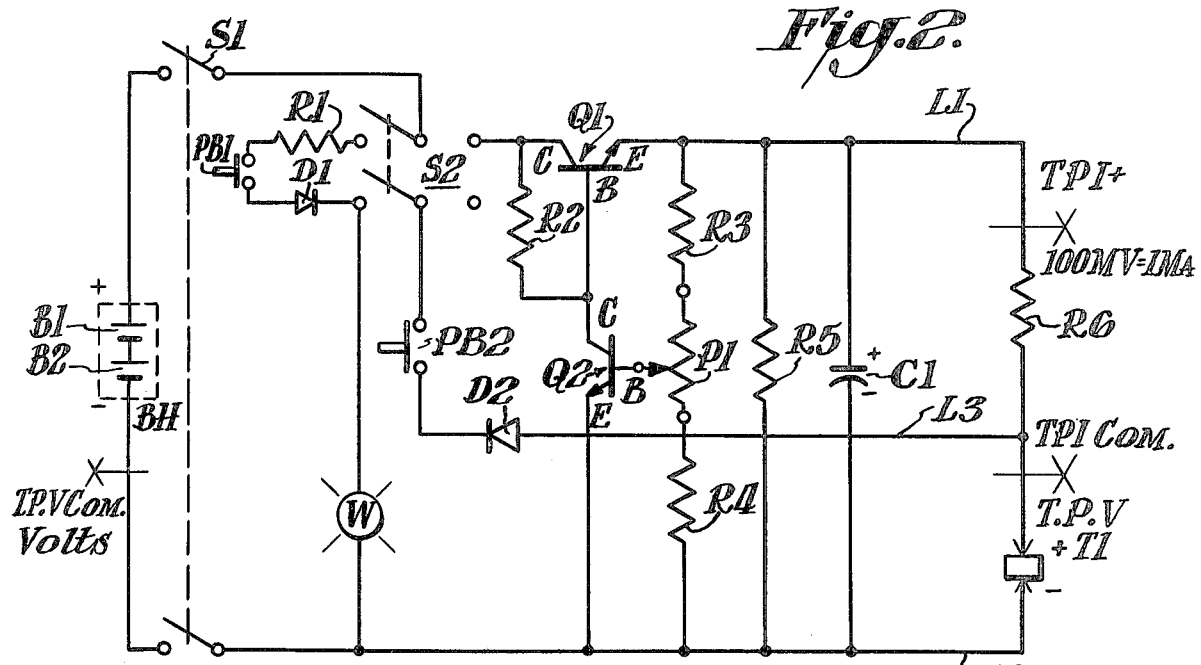

Referring to FIG. 2 particularly, the charging source consists of the two dry cells denoted B1 and B2, which are connected in series within battery holder BH to furnish a nominal 3 volt charging voltage supplied across the switch terminal contacts of "ON-OFF" switch S1. Since D size dry cells are somewhat larger than C cells, D cells provide a somewhat longer service life; however, C cells, being smaller, can be advantageously used to reduce the total weight and size of the recharger apparatus, if desired.

Because the incorporation of TEST facilities is optional, although highly desirable, description of the TEST circuitry is deferred until later, it being simply noted, for the present, that switch S2, a double pole, double throw design, is connected with the upper right-hand switch contact in the hearing aid battery charging circuit, upon which contact switch S2 is always closed when battery recharging is to be effected.

Lead L1 runs, via resistor R6, the hearing aid batttery charge-limiting resistor, to the positive battery charging contact $T_1$, the circuit during recharge service being completed through the hearing aid battery HB, then via lead L2 back to the negative terminal of charging source B2.

Essential recharging current and voltage control is maintained by the regulating circuit inclusive of transistors $Q_1$ and $Q_2$, resistor R2 and potentiometer $P_1$, together with its end resistors R3 and R4.

The range of potentiometer P1 is effectively preset by incorporating within the resistance circuit, at the ends, resistors R3 and R4, respectively, the potentiometer sliding tap, connected with the base of transistor Q2, being suitably adjusted at the factory prior to sale of rechargers to the public.

Transistor Q2 is connected via its collector element to the base of transistor Q1, which latter effects the recharging current flow through its collector and emitter elements connected in series with lead L1. A biasing resistor R2 connects the collector elements of transistors Q1 and Q2, whereas the transistor emitter elements are connected to leads L1 and L2, respectively, with potentiometer R3, P1, R4 connected in shunt with respect to the emitter elements.

In operation, recharging current flow is regulated by passage through Q1 via its collector and emitter elements as a function of the potential applied to the Q1 base element by the collector of transistor Q2. Biasing resistor R2 imposes a stabilizing action on the control effected by transistor Q1, since excess current from the charging source is shunted around transistor Q1 via resistor R2 and the collector and emitter elements of transistor Q2 back to the source.

The regulating circuit described has effected good recharging current and voltage control regardless of the different internal resistances of hearing aid batteries as received for recharging, normally encountered environmental temperature variations and component aging.

Turning now to the TEST facilities, the left-hand contacts of double pole, double throw switch S2 are connected through separate sub circuits effecting, respectively, an operator's selective testing of the source voltage by momentary closure of push button switch PB1 or a hearing aid battery received for recharging by push button switch PB2.

As shown in FIG. 2, an incandescent test lamp W is connected from lead $L_1$ via the upper left-hand switch S2 contacts and switch PB1 to lead L2. A readily available size of test lamp W is the 1.5 v. incandescent miniature type, which, if used, should include a protecting 1.1 v. dropping resistor $R_1$ in series circuit through pushbutton switch PB1. D1 (voltage drop 0.4 v.) is a conventional diode which, in conjunction with D2, blocks flow of current through the subcircuit if PB1 and PB2 are accidentally held closed, as, for example, by the weight of clothing or other articles in a suitcase if the recharger is taken along on a journey and switches S1 and S2 happen to be in closed TEST position.

The TEST sub circuit for hearing aid battery HB comprises a lead L3 connected between the positive battery charging contact side and the lower left-hand switch S2 contact through lamp W to lead L2 via pushbutton switch PB-2. Again, a protective diode D2 is interposed in the lead L3 circuit with, in conjunction with D1, bars accidental overcharge of the hearing aid battery if PB2 and PB1 are simultaneously closed.

The initial conditions of both the recharging source and the hearing aid battery to be recharged are evaluated visually by the brilliance of test lamp W when illuminated by selective closure of push-button switches PB1 or PB2. Noticeable dimness of the lamp W on PB1 closure signals that source B1B2 has discharged to a level where replacement with fresh batteries is advisable. Similarly, if lamp W remains unilluminated, or only very dimly illuminated, upon closure of switch PB2, the hearing aid battery is probably discharged, or aged, beyond the point where recharging will be effective, so that this particular battery should be discarded and a fresh hearing aid battery procured in replacement.

Finally, there is some advantage in utilizing an electrical filter circuit consisting of resistor R5 in parallel connection with capacitor C1 across leads L1 and L2. Thus, if there is a momentary accidental dislodgement of the sliding tap from the co-acting resistor of potentiometer P1, the filter will prevent damage to a hearing aid battery in recharge position during the very short time interval when a possibly damaging current surge could occur across the battery charging contacts.

Extensive experience with the hearing aid battery recharger of this invention has shown that a current charging rate of 1–1.5 ma, corresponding to an applied charging voltage of 100–150 mv, measured across R6, give satisfactory hearing aid battery recharging over periods of 12 to 24 hours. Test points TPI+ and TPI common provided an opposite sides of resistor R6, and TPV and TPV common provided on opposite sides of hearing aid battery HB are helpful in the initial setting of the tap of potentiometer P1, after which no other adjustments are necessary over the full service life of the recharging apparatus.

Hearing aid users conveniently use their aids for approximately 16 hours maximum, after which the battery can be placed in the invention apparatus for recharging. If the user has a spare hearing aid battery, this can be plugged into his hearing aid at the start of the next following 16 hours service, so that the recharging time afforded for each hearing aid battery in turn is conveniently in the range of 20–24 hours, alternating with approximately 16 hour use periods.

With such a regime, I have been able to recharge one Type 76 hearing aid battery sixty-nine times prior to failure of the battery itself. Another Type 76 hearing aid battery has been recharged seventy-two times, and is still in use and giving continued good service.

Similarly, recharging of Type 675 batteries has proved entirely practical. One such battery has been recharged thirty-eight times and is still giving good service. Incidentally, this particular hearing aid battery was accidentally left in the recharging apparatus for 48 hours on one occasion and there was no perceptible damage to either the hearing aid battery or the source battery as a result.

Although the foregoing tests drew current from the Type C source batteries continuously over a period of approximately eight months, the original battery pairs remained completely serviceable throughout the full period of use, and continue to be effective, even though the as-received condition of the source dry cells was not optimum to begin with due to prolonged shelf storage as old stock.

Figure 1:
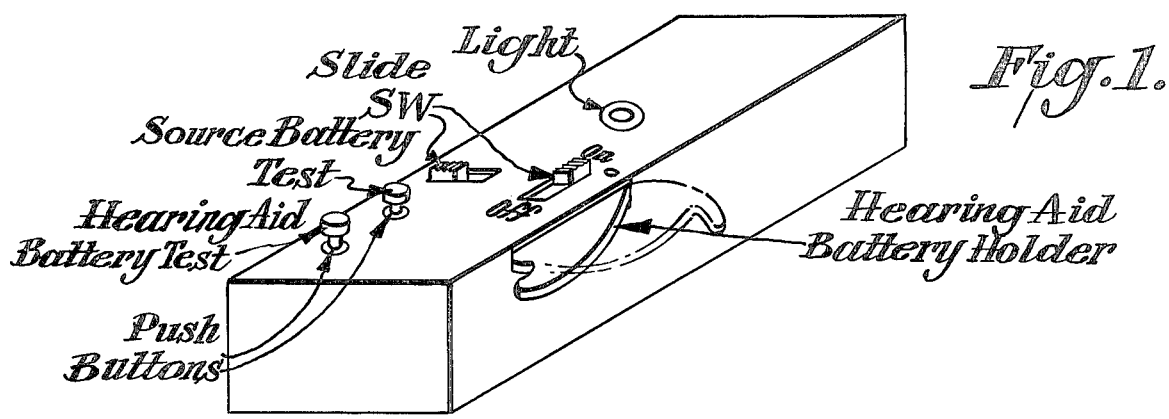
Figure 3:
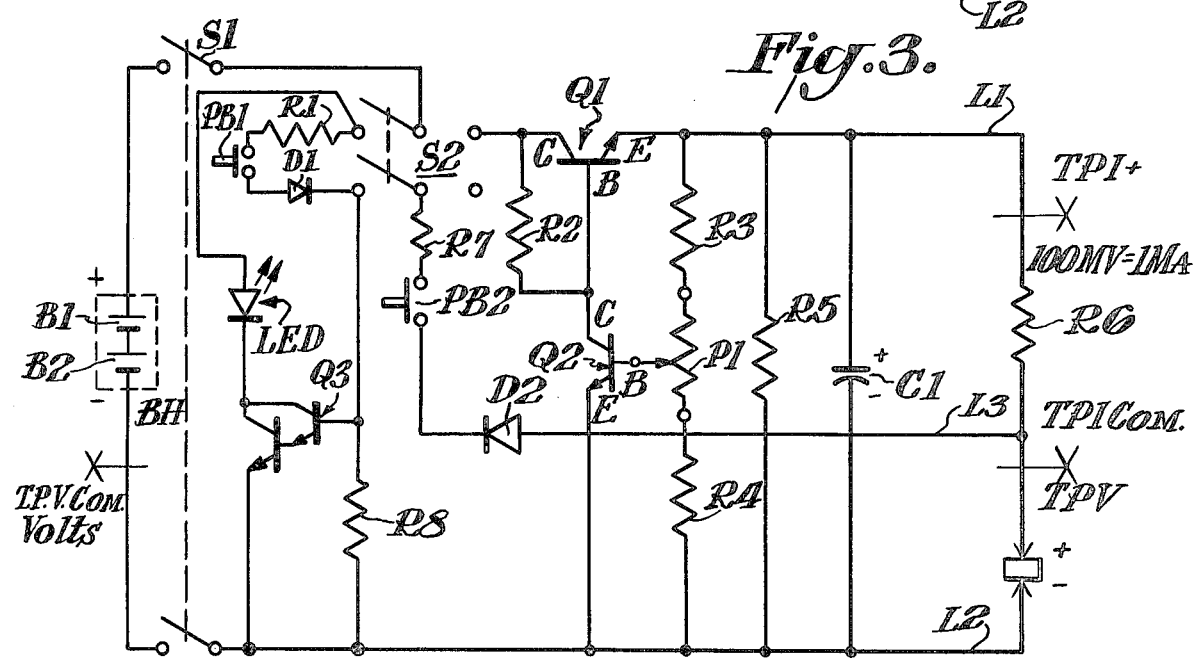

Referring to FIG. 1, the recharging apparatus of this invention is housed within a small-sized plastic case provided with a metal face plate, the case typically measuring approximately $1\frac{5}{8}'' \times 2\frac{5}{8}'' \times 5\ 1/16''$. The face plate is apertured for reception of the slide actuators of the ON-OFF (S1) and the TEST (S2) switches, as well as the two push button switches. As hereinbefore described, the normally open TEST push button switches consist of the charging source battery test (PB1) and the hearing aid battery test (PB2). The incandescent lamp W, or its LED counterpart hereinafter described with reference to FIG. 3, is housed within the case, but readily viewed by the operator through a "Light" lens fitted in the faceplate. Typically, a recharging apparatus, complete with C dry cells, weighs about 12 ounces.

The hearing aid battery to be charged is placed within conventional spring contacts (not shown) connected in circuit with leads L1 and L2, the battery and its charging contacts being conveniently mounted on a side-opening swivel plate holder which can be swung to closed position during hearing aid battery recharging and pulled outwardly for easy removal of hearing aid batteries after recharging is completed.

FIG. 3 is a schematic circuit diagram of a second embodiment of recharging apparatus according to this invention which substitutes a light-emitting diode (LED) in conventional circuit employing a Darlington Amplifier subcircuit, denoted generally at Q3, for switching.

In this circuit, resistor R8 in conjunction with either resistor R1 or R7 constitute a voltage dividing circuit for the base of Q3. Resistors R1 and R7 are chosen to give the appropriate switching voltage at the Q3 base when the respective charging source battery or the hearing aid battery, at acceptable voltage levels, are switched into circuit via PB1 or PB2.

Figure 4:
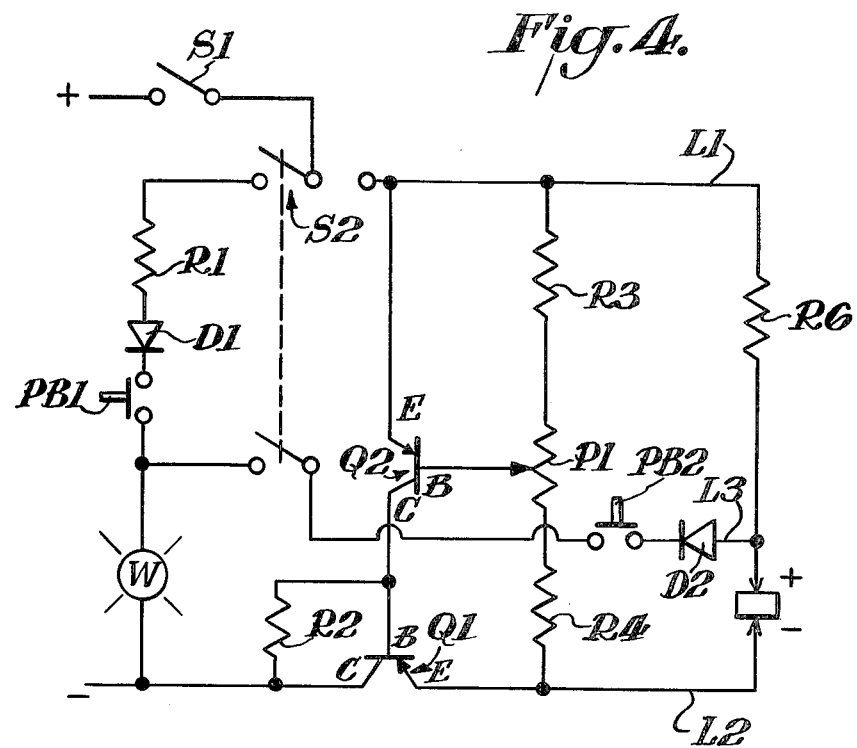

FIG. 4 is a schematic fragmentary circuit diagram of the first embodiment of my invention showing the details of PNP transistor connection where it is desired to utilize these instead of the NPN design of FIG. 2. It will be seen that the circuit alterations are effected by the usual symmetrical substitution of the two types of transistors.

Several hearing aid battery recharging apparatus test models according to this invention, using NPN transistors, have been fabricated from the following specific components, operation being entirely satisfactory in all cases:

| | |
|---|---|
| B1, B2 1.5v C cells | R4 2KΩ 5% |
| Q1, Q2 NPN RS 2009 | R5 33KΩ 5% |
| C1 CAP 200 mfd-6v | R6 100Ω 5% |
| P1 1KΩ Potentiometer | R7 600Ω 5% |
| R1 51Ω nominal, 5% tolerance | R8 2KΩ 5% |
| R2 1KΩ 5% | Q3 Darlington Amplifier |
| R3 3KΩ 5% | LED DIALIGHT Type 521-9189 W 1.5v type T1 miniature lamp |

What is claimed is:

1. An electrical recharging apparatus for hearing aid batteries of the silver oxide and mercurous oxide types comprising, in electrical circuit in the order recited:
   (a) a dry cell charging source supplying, across its output terminals, a charging potential of, nominally, 3 volts,
   (b) an "ON-OFF" double pole single throw switch having switching contacts interposed in series with each of said charging source output terminals,
   (c) a preselected charging current-controlling resistor,
   (d) hearing aid battery charging contacts connected at corresponding polarity sides with said output terminals of said charging source and with said hearing aid battery to be charged via said preselected charging current-controlling resistor and said "ON-OFF" switch, and
   (e) a voltage regulating circuit connected in shunt with said battery charging contacts past said "ON-OFF" switch comprising a first transistor connected via its collector and emitter elements, respectively, in series relationship between said charging source and one charging contact for said hearing aid battery in a polarity sense maintaining charging current flow through the collector-emitter pair of said first transistor, a preselected biasing resistor, a second transistor connected with its collector element in circuit with the base element of said first transistor and with the collector element of said first transistor via said preselected biasing resistor which, in conjunction with said second transistor, limits the base-emitter current of said first transistor, a potentiometer, the emitter element of said second transistor connected to the appropriate polarity side of said charging source and the base element of said second transistor connected to the tap of said potentiometer which is connected from emitter element to emitter element of said transistors in shunt across said battery charging contacts.

2. An electrical recharging apparatus for hearing aid batteries according to claim 1 wherein said transistors are of the NPN type
   with said first transistor connected via its collector and emitter elements, respectively, in series relationship between the positive terminal of said charging source and the positive charging contact for said hearing aid battery, and said second transistor connected with its collector element in circuit with the base element of said first transistor and with the collector element of said first transistor via said preselected biasing resistor and emitter element connected to the negative side of said charging source.

3. An electrical recharging apparatus for hearing aid batteries according to claim 1 wherein said transistors are of the PNP type
   with said first transistor connected via its collector and emitter elements, respectively, in series relationship between the negative terminal of said charging source and the negative charging contact for said hearing aid battery, and said second transistor connected with its collector element in circuit with the base element of said first transistor and with the collector element of said first transistor via said preselected biasing resistor and emitter element connected to the positive side of said charging source.

4. An electrical recharging apparatus for hearing aid batteries according to claim 1 wherein there is provided an electrical filter sub circuit consisting of a preselected resistor and a preselected capacitor connected in parallel one with the other and in shunt across said battery charging contacts.

5. An electrical recharging apparatus for hearing aid batteries according to claim 1 wherein there is provided TEST switching means in circuit with a test lamp permitting selective optional manual imposition of said charging source in circuit across said test lamp or said hearing aid battery in circuit across said test lamp.

* * * * *